Dec. 11, 1923.                                              1,477,109
                    S. O. COWPER-COLES
PROCESS FOR THE MANUFACTURE OF ZINC CYLINDERS FOR PRIMARY BATTERIES
                     Filed May 11, 1920
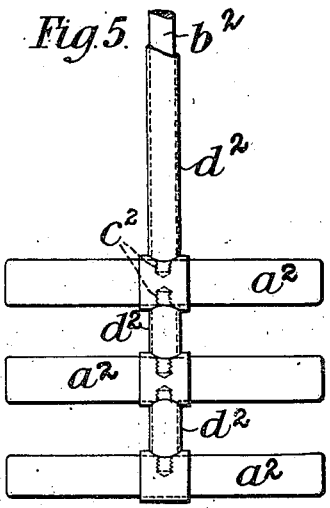
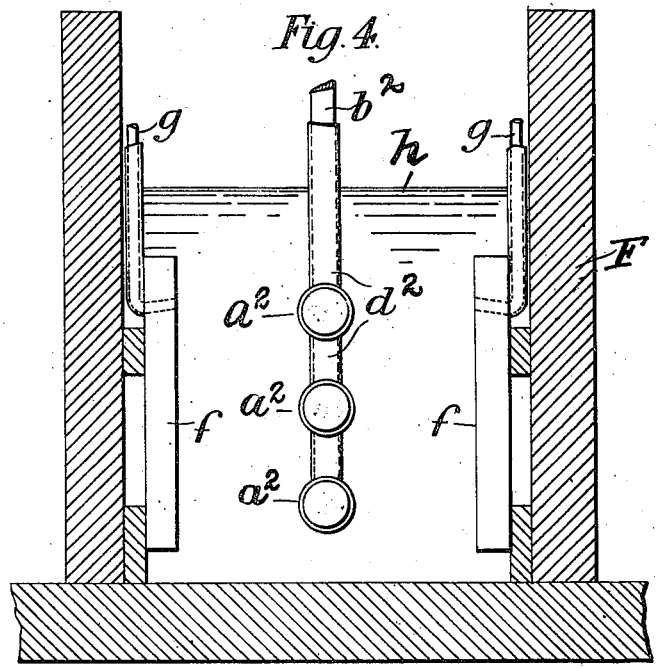
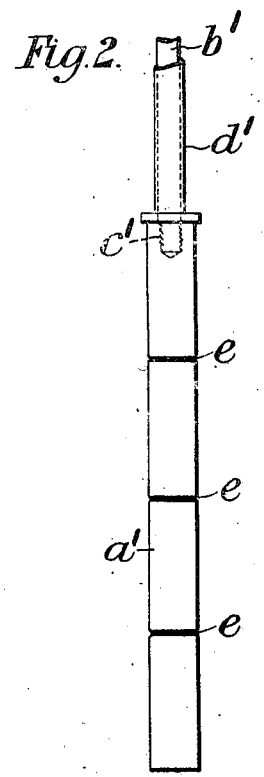
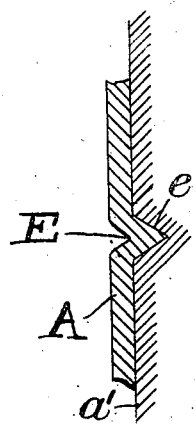
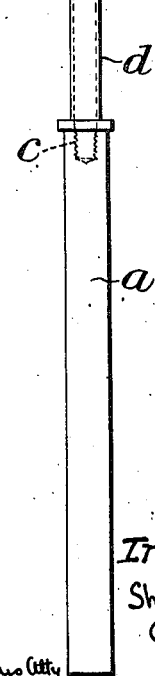
Inventor:
Sherard O. Cowper-Coles Patented Dec. 11, 1923.

1,477,109

UNITED STATES PATENT OFFICE.

SHERARD OSBORN COWPER-COLES, OF SUNBURY-ON-THAMES, ENGLAND.

PROCESS FOR THE MANUFACTURE OF ZINC CYLINDERS FOR PRIMARY BATTERIES.

Application filed May 11, 1920. Serial No. 380,628.

*To all whom it may concern:*

Be it known that I, SHERARD OSBORN COWPER-COLES, a subject of the King of Great Britain, residing at Rossall House, Thames Street, Sunbury-on-Thames, Middlesex, England, have invented a new and useful Improved Process for the Manufacture of Zinc Cylinders for Primary Batteries; and I do hereby declare that the following is a full, clear, and exact description of the invention, which will enable others skilled in the art to which it appertains to make and use the same.

My invention relates to an improved process for the manufacture of zinc cylinders for use for the primary batteries of flash lamps and for other purposes.

In the accompanying drawing I have shown several forms of apparatus for carrying my invention into effect, in which drawing.

Fig. 1 is an elevation of one form of mandrel which may be employed for the deposition of the cylinders thereon.

Fig. 2 is a similar view of a modified form of mandrel provided with spaced annular grooves to produce weak lines of cleavage in the deposited cylinder to facilitate its separation into short lengths.

Fig. 3 is an enlarged partial sectional view of a portion of the mandrel shown in Fig. 2 and the deposited cylinder, and showing the effect of the annular grooves in producing the weak lines of cleavage.

Fig. 4 represents a sectional view of an electrodepositing vat, which may be employed in carrying out my invention, and illustrating thereon a different form of mandrel provided with a number of moulds arranged upon a vertical spindle and disposed at right angles.

Fig. 5 is a detail elevation of the mandrel shown in Fig. 4, detached.

Hitherto it has been the practice to make such cylinders from sheet zinc which is cut to size and bent round into the form of a tube the edges of which are then soldered together and for some constructions of battery the cylinders have bottoms soldered in. This process is costly and possesses the disadvantage that the solder being in contact with the zinc sets up secondary action and reduces the efficiency of the battery.

The improved process consists in electrodepositing zinc cylinders of the required thickness and size on mandrels which have been previously coated with some stripping material such as beeswax and turpentine coated with plumbago or bronze powder or of which the surface has been oxidized or sulphidized the said cylinders being then removed from the mandrels and cut to the desired lengths. Or V-shaped grooves may be made around the mandrel so as to form weak lines of cleavage for the purpose of dividing the tubes into the desired lengths. Before being removed from the mandrels the said cylinders may be backed or reinforced with some suitable insulating material such as brown paper and asphaltum. It is obvious that, by allowing the deposit to take place at one end of the mandrel, cylinders may be produced with one end closed, and in order to increase the output for a given size plant the mandrel is provided with a number of moulds arranged on a vertical spindle at right angles to the axis of the spindle. With this process zinc cylinders can be made of one half or less than one half the thickness of cylinders made by the process of using zinc sheets. In order to effect an economy in the consumption of the zinc, only a comparatively thin deposit may be allowed for the cylinders which are then strengthened by electro-depositing iron thereon to the requisite thickness. Or the cylinders may be first formed by the electro-deposition of iron, which is annealed to increase its toughness, and then lined with zinc by electro-deposition.

In the accompanying drawing Fig. 1 represents one form of mandrel which I may employ in carrying out my invention, and comprising the cylindrical metal body *a* which is suitably provided with means for suspending it vertically in the electrolyte, and connecting it electrically with the source of electric current, in this instance an electric conductor and support *b*, being screwed into the end of the mandrel, as at $c$, and provided with insulation as usual, indicated at $d$. The mandrel, suitably coated as before stated, is suspended in an electrolyte, in which is also suspended the usual anode.

In Fig. 2 I have shown a modified form of mandrel $a'$, having the usual conductor and support $b'$, screwed into the same, as at $c'$, and provided with insulation, as at $d'$. The mandrel $a'$ is provided at intervals with annular grooves, and when the deposited cylinder of metal is deposited thereon, these grooves will form weak lines of cleavage, as indicated in Fig. 3, in which a portion of the deposited cylinder is indicated at A, formed with an annular indented portion E, following the contour of the groove $e'$ in the mandrel, and forming a weak line of cleavage to facilitate the separation of the deposited cylinder into short lengths.

In Fig. 4 I have shown an electrodeposition vat F provided with the usual anodes $f$—$f$, supported by conductor supports $g$, in the electrolyte $h$. In Figs. 4 and 5 I have shown another form of mandrel having a vertical spindle portion $d^2$, carrying a group of moulds $a^2$ arranged at right angles thereto, the whole suspended from the conductor support $b^2$.

Claims.

1. A process for the manufacture of zinc cylinders for use for the primary batteries of flash lamps and for other purposes, consisting in electro-depositing zinc cylinders of the required thickness and size on mandrels and preventing the deposited metal from becoming an integral part of the mandrel and then removing the deposited cylinders from the said mandrels and cutting them to the desired lengths substantially as hereinbefore described.

2. A process for the manufacture of zinc cylinders for use for the primary batteries of flash lamps and for other purposes, consisting in electro-depositing zinc cylinders of the required thickness and size on mandrels previously coated with stripping material and then removing the deposited cylinders from the said mandrels and cutting them to the desired length substantially as hereinbefore described.

3. A process for the manufacture of zinc cylinders for use for the primary batteries of flash lamps and for other purposes, consisting in electro-depositing zinc cylinders of the required thickness and size on mandrels of which the surface has been oxidized and then removing the deposited cylinders from the said mandrels and cutting them to the desired lengths substantially as hereinbefore described.

4. A process for the manufacture of zinc cylinders for use for the primary batteries of flash lamps and for other purposes, consisting in electro-depositing zinc cylinders of the required thickness and size on mandrels of which the surface has been sulphidized and then removing the deposited cylinders from the said mandrels and cutting them to the desired lengths substantially as hereinbefore described.

5. A process for the manufacture of metal cylinders, which consists in electrodepositing a metallic cylinder upon a mandrel, applying a reinforcing backing to the deposited cylinder while upon the mandrel, and then removing the cylinder with the reinforcing backing from the mandrel.

6. A process for the manufacture of metallic cylinders which consists in electrodepositing a metallic cylinder upon a mandrel and forming annularly disposed weakened portions, providing lines of cleavage in the deposited metal, removing the deposited cylinder from the mandrel and dividing it into separate sections on said lines of cleavage.

7. A process for the manufacture of metal cylinders, which consists in electrodepositing a thin coating of metal upon a mandrel, then depositing a reinforcing coating of a different metal upon the exterior of the first deposited cylinder, and then removing the reinforced cylinder so formed, longitudinally from the mandrel.

8. A process for the production of a reinforced metallic cylinder, which consists in first electrodepositing a metallic cylinder on a mandrel, removing said cylinder from the mandrel, and electrodepositing a metallic lining of a different metal on the inner face of the said deposited cylinder.

9. A process for the production of reinforced metal cylinders with integral closed end, which consists in electrodepositing a thin coating of metal upon the lateral surface and one end of a mandrel to form a cylinder closed at one end by an integral portion, and electrodepositing upon the cylinder and the end portion thereof an integral coating of a different metal to form a reinforcing backing therefor.

10. A process for the production of reinforced metal cylinders, closed at one end, which consists in electrodepositing a thin coating of metal upon the lateral surface and one end of a mandrel, withdrawing the cylinder, with integral closed end so formed, from the mandrel, and electrodepositing a thin coating of a different metal upon the inner faces of the cylinder, and end wall.

11. As a new article of manufacture, a zinc battery element comprising a seamless cylinder of electrodeposited metal.

12. As a new article of manufacture, a zinc battery element comprising a seamless cylinder of electrodeposited metal, having one end closed by an integral transverse wall.

13. As a new article of manufacture, a zinc battery element comprising a seamless cylinder of electrodeposited metal, surrounded by a reinforcing layer of different electrodeposited metal.

14. As a new article of manufacture, a zinc battery element comprising a seamless cylinder of electrodeposited metal, having one end closed by an integral transverse wall and surrounded by a reinforcing layer of different electrodeposited metal extending integrally around the lateral walls and over the exterior face of said transverse wall.

SHERARD OSBORN COWPER-COLES.